UNITED STATES PATENT OFFICE.

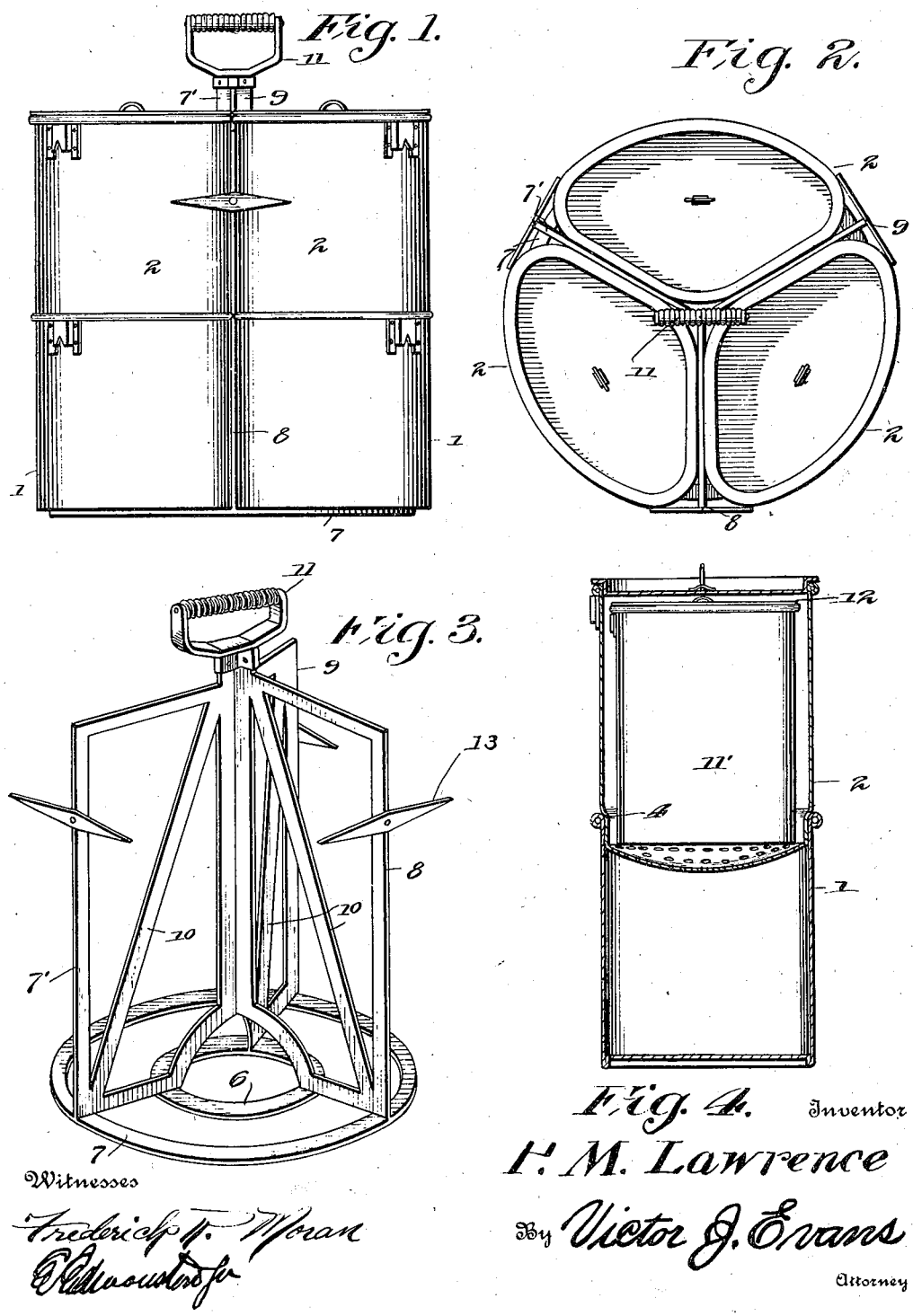

PHILIP M. LAWRENCE, OF LINCOLN, NEBRASKA.

COMBINED COOKER AND STEAMER.

1,178,525.

Specification of Letters Patent. Patented Apr. 11, 1916.

Application filed October 27, 1914. Serial No. 868,891.

*To all whom it may concern:*

Be it known that I, PHILIP M. LAWRENCE, a citizen of the United States, residing at Lincoln, in the county of Lancaster and State of Nebraska, have invented new and useful Improvements in Combined Cookers and Steamers, of which the following is a specification.

This invention relates to cookers and more particularly to combined cookers and steamers, the object of the invention being to so associate the parts that a plurality of kinds of foods may be cooked or steamed simultaneously.

It has been proposed heretofore to employ cooking receptacles which may be substantially nested together so that all receive their heat from the same burner.

It is the object of this invention not only to provide a cooker of this character but to further utilize the exhaust steam in cooking other articles of food and to this end the invention consists in providing a triplicate cooker having steaming receptacles associated therewith in such manner that the steam from the cookers will cook the food contained in the steaming receptacles.

A further object of the invention is to provide a novel form of support for the combined cooker and steamer.

Further objects of the invention will appear as the following specific description is read in connection with the accompanying drawing which forms a part of the application, and in which:—

Figure 1 is a side elevation. Fig. 2 is a top plan view. Fig. 3 is a perspective view of the cooker with the receptacles removed. Fig. 4 is a vertical sectional view through one section of the combined steamer and cooker.

Referring more particularly to the drawing, the cooker comprises three substantially triangular receptacles open at the top and having fitted thereto three substantially similar steaming receptacles provided with foraminous bottoms and open tops, said foraminous bottoms being concaved transversely and longitudinally throughout their length, as shown in Fig. 4 of the drawing. The cooking receptacles are generally indicated at 1 and the steaming receptacles which are associated therewith are generally indicated at 2. Each combined cooking and steaming receptacle is provided with a lid which is common to both the cooker 1 and the steamer 2. The receptacle 2 of each section has its wall reduced adjacent its lower end to form a shoulder 4 which rests upon the upper edge of the receptacle 1, as shown in Fig. 4, and preferably forms a vapor-tight connection between the parts. In order to support all of the sections of the combined steamer and cooker over a single burner whereby they may be simultaneously removed, I provide a rack consisting of a pair of concentrically arranged circular bars 6 and 7 joined together by substantially rectangular, vertically arranged wings 7, 8 and 9 constructed as shown in Fig. 3. These wings are spaced apart so as to enter between the side walls of the adjoining receptacles and they are reinforced by diagonal braces 10 which extend from the outer lower corner of the wings to the upper inner corner as shown. The inner portion of each frame extends above the upper edge of the frame and is connected, as shown, to a handle 11 by which the device may be carried.

In order that the receptacles may be held against accidental displacement from the rack, each wing is provided with a pivoted locking arm 13 adapted to assume both horizontal and vertical positions and when in horizontal position to extend across the outer walls of adjoining receptacles, as shown in Fig. 1.

Mounted within each of the steamers 2 are independent receptacles 11' supplied with a cover 12 independent of the lid, which is common to both the lid and steamer. These receptacles are so arranged and constructed that their side walls will be spaced from the side walls of the steaming receptacle and their cover depressed below the top of the steaming receptacle, whereby they will be substantially surrounded by steam, as will be readily understood.

The foraminous bottoms of the steamers 2 are concaved transversely and longitudinally throughout their length to permit steam from the receptacles 1 to contact with the entire surface of the bottoms of the receptacles 11' when placed within the steamers 2.

The confronting side edges of the wings 7', 8 and 9 have their lower inner corners curved inwardly toward the outer side edges of the wings to space the confronting side edges of the wings above the opening in the ring 6 so that, when the rack is placed over the opening above the simmering burner in a stove, the confronting side edges of the wings which provide a standard to which the handle 11 is attached is prevented from becoming heated by the flame from the burner.

Having thus described the invention, what is claimed as new is:—

In a supporting rack for triplicate steamers and cookers, substantially rectangular shaped frames each having a side edge arranged in confronting relation to provide a standard, spaced and concentrically arranged rings connected to the bottom ends of said frames and adapted to encircle the opening in a stove above a burner, a handle connected with the confronting side edges above the frames, and curved portions extending downwardly and outwardly from the ends of the confronting side edges of the frames above the opening in the innermost ring whereby the standard portion of the rack is held in spaced relation above the opening in the innermost ring to prevent the standard portion of the rack from becoming overheated.

In testimony whereof I affix my signature in presence of two witnesses.

PHILIP M. LAWRENCE.

Witnesses:
JOHN W. BREWSTER,
O. L. WRIGHT.